(12) United States Patent
Rydell

(10) Patent No.: US 12,522,182 B2
(45) Date of Patent: Jan. 13, 2026

(54) OUTPUTTING AIR USING COMBINATION OF AIR AND SPRAY NOZZLES ON WIPERS TO PREVENT WINDSHIELD WIPER RUNOFF AND CLEAR RAIN

(71) Applicant: TOYOTA MOTOR ENGINEERING & MANUFACTURING NORTH AMERICA, INC., Plano, TX (US)

(72) Inventor: Jesse Dwayne Rydell, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/479,677

(22) Filed: Oct. 2, 2023

(65) Prior Publication Data
US 2025/0108777 A1  Apr. 3, 2025

(51) Int. Cl.
*B60S 1/54* (2006.01)
*B60S 1/04* (2006.01)

(52) U.S. Cl.
CPC ............ *B60S 1/544* (2013.01); *B60S 1/0491* (2013.01)

(58) Field of Classification Search
CPC .......... B60S 1/524; B60S 1/0848; B60S 1/48; B60S 1/3415; B60S 1/54; B60S 1/52; B60S 1/544; B60S 1/481; B60S 1/08; B60S 1/0814; B60S 1/0807; B60S 1/0491

USPC .......................................................... 15/313
See application file for complete search history.

(56) References Cited

U.S. PATENT DOCUMENTS

| | | | |
|---|---|---|---|
| 6,084,519 A * | 7/2000 | Coulling | B60S 1/0822 250/575 |
| 7,040,328 B2 | 5/2006 | Woodard | |
| 10,807,569 B2 | 10/2020 | Ghannam | |
| 10,807,570 B2 | 10/2020 | Giraud | |
| 11,040,703 B1 | 6/2021 | Adamczak | |
| 11,117,554 B2 | 9/2021 | Kiyama | |
| 2015/0151720 A1 | 6/2015 | Wadzinski | |
| 2017/0259788 A1 | 9/2017 | Antony-Euclid | |
| 2021/0129800 A1 | 5/2021 | Park | |
| 2022/0306270 A1 * | 9/2022 | Mugeraya | B08B 3/024 |

FOREIGN PATENT DOCUMENTS

| | | | |
|---|---|---|---|
| CN | 111645634 B | 5/2022 | |
| DE | 102014210608 | 12/2015 | |
| EP | 3960555 A1 | 3/2022 | |
| FR | 2991948 A1 * | 12/2013 | B60S 1/482 |

(Continued)

*Primary Examiner* — Katina N. Henson
(74) *Attorney, Agent, or Firm* — SHEPPARD, MULLIN, RICHTER & HAMPTON LLP; Daniel N. Yannuzzi

(57) ABSTRACT

Systems and methods are provided for operating a windshield wiper comprising a one or more nozzles for outputting a gas. Examples include a windshield wiper system that comprises a wiper blade, a windshield wiper arm configured to couple to the wiper blade at a distal end and couple to a vehicle at a proximal end, one or more nozzles disposed at the distal end of the windshield wiper arm, and a processor communicatively coupled to the one or more nozzles. The processor is configured to control the one or more nozzles to selectively output a gas based a position of the wiper blade on a windshield.

20 Claims, 9 Drawing Sheets

(56) References Cited

FOREIGN PATENT DOCUMENTS

| | | | |
|---|---|---|---|
| JP | 2006143150 | A | 6/2006 |
| KR | 100371643 | B1 | 2/2003 |
| KR | 20150114337 | A | 10/2015 |

\* cited by examiner

OUTPUTTING AIR USING COMBINATION OF AIR AND SPRAY NOZZLES ON WIPERS TO PREVENT WINDSHIELD WIPER RUNOFF AND CLEAR RAIN

TECHNICAL FIELD

The present disclosure relates generally to systems and methods for reducing windshield runoff, and, more particularly, some embodiments relate to a windshield wiping system with controllable gas for redirecting rain/runoff.

DESCRIPTION OF RELATED ART

Vehicles, such as automotive vehicles, are equipped with windshield wiper systems for ensuring a clear view through front and/or rear windshields of the vehicle. Windshield wiper systems generally includes a wiper driver (or motor) coupled to one or more wiper arms. The wiper driver rotates a fixed pivot point, which causes each arm to move across the windshield in a back and forth (sometimes arcuate) direction. The wiper arms are coupled to elastomer blades that contact the windshield and wipes fluid, debris, and the like from the windshield by sliding or dragging across a surface of the windshield.

When debris, such as dust, accumulate on the windshield, washer fluid can be sprayed onto the windshield and the wiped away via the elastomer blade. Generally, washer fluid is sprayed from spray nozzles provided in a panel between the windshield and a hood of the vehicle (i.e., the cowl of the vehicle), in the case of a front windshield. In the case of a rear windshield, a spray nozzle is generally disposed adjacent to the wiper arm and formed within weather stripping at an edge of the windshield.

BRIEF SUMMARY OF THE DISCLOSURE

According to various embodiments of the disclosed technology, systems and methods for managing vehicles to mitigate risk to the vehicles due to anomalous driving behavior are provided.

In accordance with some embodiments, a windshield wiper system is provided. The windshield wiper system comprises a wiper blade, a windshield wiper arm configured to couple to the wiper blade at a distal end and couple to a vehicle at a proximal end, one or more nozzles disposed at the distal end of the windshield wiper arm, and a processor communicatively coupled to the one or more nozzles. The processor is configured to control the one or more nozzles to selectively output a gas based a position of the wiper blade on a windshield.

In another aspect, a method of operating a windshield wiper system is provided. The method comprises tracking operating conditions on a windshield of a vehicle, outputting gas from a first at least one nozzle disposed on a first windshield wiper assembly, and adjusting an output parameter of the gas based on the tracked operating conditions. The operating conditions are one or more of: a position of a wiper blade of the windshield wiper assembly, a presence of liquid on the windshield, and a location of fluid on the windshield.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
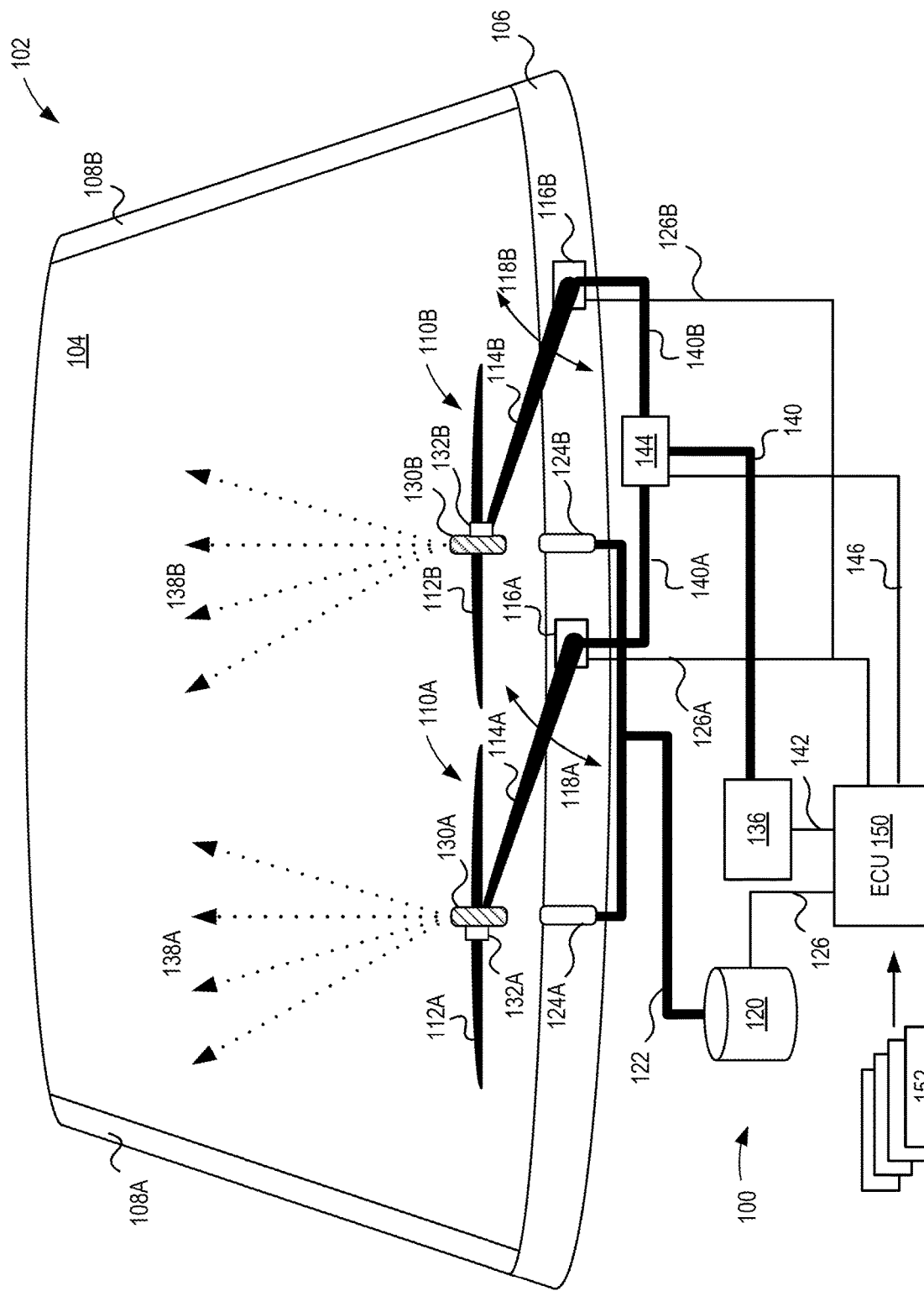
FIG. 1 is a schematic illustration of an example windshield wiper system according to embodiments of the presently disclosed technology.

The figures are not exhaustive and do not limit the present disclosure to the precise form disclosed.

DETAILED DESCRIPTION

As alluded to above, conventional windshield washer systems can include a container with washer fluid therewithin. In addition, conventional windshield washer systems can include a pump that forces the washer fluid through a washer fluid line and spray nozzles onto the windshield. Such washer fluid systems can be used to assist in the removal of debris, bugs, etc. from the windshield. Further still, typical windshield washer systems include one or more (usually two for the front windshield, one for the rear windshield) windshield wiper assemblies. A windshield wiper assembly may include a windshield wiper blade attached to one end of a windshield wiper arm, with the other end of the windshield wiper arm being operatively connected to and operated vis-à-vis an actuator or motor.

Typically, the aforementioned spray nozzles are located on a windshield wiper arm or mounted proximate to a lower/bottom section of a front windshield sometimes atop a vehicle's hood or in a cowl between the vehicle's hood and an outer surface of the windshield. In the case of rear windshields, spray nozzles can be positioned either near an upper section of the rear windshield or a lower section of the rear windshield. Regardless of placement, the spray nozzles direct washer fluid onto the windshield, while the windshield wiper arms, if turned on, rotate or otherwise move to effectuate "dragging" of their corresponding windshield wiper blades across the outer windshield surface to wipe away or clear the washer fluid.

However, the accumulation of fluid and the movement of the windshield wiper blades can often cause fluid (rain and/or washer fluid) overflow and runoff at either side of the outer windshield surface, near or at the A-pillars of the vehicle. The overflow/runoff of excess fluid from the windshield results in fluid flow over the A-pillar toward sides windows the vehicle, which can impact visibility from the side windows. Further, overflow and/or runoff can impact neighboring vehicles. For example, excess fluid on the windshield during high speed travel, such as on expressways, can blow back onto a following vehicle, which can be unsafe from a visibility perspective.

Conventionally, the problem of overflow and runoff has been solved by increasing the height of an A-pillar of the vehicle or by adding rain gutters. However, these approaches generally try to obstruct fluid overflow and runoff. Thus, overflow and runoff onto side windows can still occur, such as when there is a higher degree of fluid accumulation that overflows even these conventional approaches.

As another solution, spray nozzles can be located on the windshield wipers themselves can provide a localized fluid spray onto specific regions of windshield over which the wiper blades travel. However, this solution can still result in overflow and runoff as the sprayed fluid flows from an initially sprayed location to an outer edge of the windshield near the A-pillar and accumulates, thereby causing overflow and runoff.

Embodiments disclosed herein overcome the above described short comings of the conventional approaches through selectively expelling gas, such as but not limited to air, from one or more nozzles provided on a windshield wiper assembly. For example, the one or more nozzles can be provided at the end of an wiper arm attached to the wiper blade. An amount, direction, speed, and/or pressure at which the gas is expelled from the nozzle can be selectively controlled according to the needs of the vehicle. For example, a reduction in windshield wiper runoff can be achieved by expelling gas in a direction dependent on the position of the wiper blade with respect to a windshield of the vehicle. Orientations of the one or more nozzles can be controlled so to expel gas in a desired direction. By controlling the direction, excess fluid on the windshield can be directed away from one edge of the windshield (e.g., a driver side edge) toward another edge of the windshield (e.g., upper edge) of the windshield to reduce runoff and overflow over the A-pillar. Similarly, the amount of gas flow (e.g., a measure of air output in terms of volume per unit of time), pressure (e.g., a measure of force applied to the nozzle opening through which gas is expelled), and/or velocity (e.g., how fast the air is moving in distance per unit of time) at which the gas is expelled from the one or more nozzle can be controlled based on the position of the wiper blade.

Embodiments disclosed herein can determine a location and/or direction of travel of the windshield wipers on the surface of the windshield and control the one or more nozzles based on the determined location and/or direction. For example, embodiments disclosed herein may utilize sensor data, such as, but not limited to, image data, radar data, LiDAR data, and so on to determine the location of the windshield wipers along the outer surface (e.g., exterior of the vehicle cabin) of the windshield. In one example, when the windshield wipers are located adjacent to a bottom edge of the windshield and the windshield wipers are moving in a direction towards a upper edge of the windshield, embodiments disclosed herein may be configured to output gas from the one or more nozzles in a direction toward the upper edge, thereby redirecting any fluid on the surface of the windshield toward the upper edge and possibly above the vehicle. Additionally or alternatively, when the above conditions exist, the one or more nozzles may be controlled to direct the gas in a direction toward the far end of the windshield wipers (e.g., an end of the windshield wiper furthest from the pivot point) to avoid runoff.

In another example, when the windshield wipers are adjacent to the upper edge of the windshield and moving in a direction towards the bottom edge of the windshield, the one or more nozzles can be controlled so to direct any fluid on the windshield downward toward the bottom edge. In one example, the one or more nozzles may be controlled so to not output gas, thereby allowing fluid on the windshield to be wiped by the windshield wipers in the direction toward the bottom edge of the windshield as the windshield wipers move toward the bottom edge. In a case where washer fluid is sprayed onto the windshield by spray nozzles, this configuration permits the washer fluid to be sprayed and then wiped downward by the windshield wiper, without be blown away by output gas, so to clear any debris or rain water on the surface.

Embodiment disclosed herein can vary an amount of gas flow (e.g., air flow rate) of the gas output by the one or more nozzles. For example, embodiments disclosed herein can determine an amount of washer fluid and/or rain is present on the windshield surface. If the determined amount is below a set threshold amount, the one or more nozzles may be controlled to output gas at a lower flow rate to remove the amount the wiper fluid and/or rain. If, on the other hand, a large amount of fluid and/or rain is present on the windshield (e.g., above the set threshold), the one or more nozzles can be controlled to output gas at a higher flow rate to remove the washer fluid and/or rain. The flow rate may be controlled by adjusting an volume (e.g., an amount) of gas output per unit of time, a pressure and/or velocity at which the gas is expelled. For example, increasing the volume of gas forced through the nozzle for a unit of time can increase the pressure and velocity of the gas, which increases the flow rate. Accordingly, embodiments disclosed herein can vary the volume and/or flow rate of the gas from a minimum value (e.g., none) to a maximum value based on an amount of fluid (e.g., washer fluid and/or rain) detected on the windshield. The volume and/or flow rate may be proportional to the amount of fluid present on the windshield.

In some embodiments, a windshield wiper assembly may include multiple nozzles for outputting gas and washer fluid. In this case, embodiments disclosed herein can control the spray nozzles to output fluid according to the presence of fluid on the windshield by mixing gas with washer fluid, thereby using less washer fluid to clear debris due to the presence of gas. That is, as the amount of fluid present on the windshield increases, the amount of washer fluid expelled can be decreased, while the gas expelled is controlled to direct any excess fluid so to reduce runoff and overflow.

In another example, embodiments disclosed herein can control which nozzles of a plurality of nozzles output gas. For example, each windshield wiper assembly of a pair of windshield wiper assemblies may comprise one or more nozzles, such that a first windshield wiper assembly comprises a first one or more nozzles and a second windshield wiper assembly comprises a second one or more nozzles. Embodiments disclosed herein may use sensor data, such as, but not limited to, image data, radar data, LIDAR data, and so on to determine which areas of the surface of the windshield have fluid present thereon. For example, a first area (e.g., driver side area of the windshield) of the windshield may correspond to a first windshield wiper assembly and a second area (e.g., passenger side area) may correspond to a second windshield wiper assembly. If, for example, fluid is detected on the first area and not on the second area, embodiments disclosed herein may output gas from first one or more nozzles of the first windshield wiper assembly, while not outputting gas from the second one or more nozzles. As described above, in addition to controlling which one or more nozzles output gas, the embodiments disclosed herein can control the timing of when the one or more nozzles output gas (e.g., the nozzles can be controlled to only output gas when the wipers are moving down towards the bottom of the windshield).

In another example where a given windshield wiper comprises a plurality of nozzles, embodiments disclosed herein can control which of the plurality of nozzles expel gas by detecting which sub-region of an area corresponding to the windshield wiper assembly has fluid present thereon. That is, for example, a driver side area of the windshield may comprise a number of sub-regions and the windshield wiper comprises a number of nozzles corresponding to the sub-regions. The embodiments disclosed herein may detect fluid present in one or more of the sub-regions and trigger one or more nozzles corresponding to the sub-regions on which fluid is detected. As another example, one or more nozzles may be triggered to output gas to collectively direct the fluid to reduce runoff and overflow.

Some embodiments can be configured to control the one or more nozzles to output gas responsive to detecting rain present on the windshield. For example, nozzles may be located on a bottom portion of the windshield wiper assemblies. If the system determines that it is lightly raining, the nozzles may be controlled to output gas at a low flow rate as the windshield wipers move down toward the bottom edge of the windshield to clear the windshield of rain. If it is determined that there is a heavy downpour, nozzles may be controlled to output gas at a high speed as the wipers move down toward the bottom of the windshield to clear the windshield of rain. Moreover, as the windshield wipers move up toward the top edge of the windshield, embodiments disclosed herein may control the nozzles to prevent the output of gas.

FIG. 1 is a schematic illustration of a windshield wiper system 100 according to embodiments of the presently disclosed technology. The windshield wiper system 100 includes windshield wiper assemblies 110A and 110B that can be operated to clear a windshield 104 of a vehicle 102. Each windshield wiper assembly 110A and 110B includes an elastomer blades 112A and 112B attached to one end (e.g., the distal end) of a windshield wiper arms 114A and 114B, respectively, with the other end (e.g., proximal end) of the windshield wiper arms 114A and 114B being operatively connected to and operated vis-à-vis actuators 116A and 116B, respectively. An electronic control unit (ECU) 150 may operate to supply wiper control signals over communication lines 126A and 126B (e.g., wired or wireless communication interface) to activate the actuators 116A and 116B so to cause the windshield wiper arms 114A and 114B to move across the windshield 104 back and forth along wiper travel paths 118A and 118B, respectively. As a result, the blades 112A and 112B are dragged or slide across the surface of the windshield 104 so to wipe any fluid, debris, and the like from the surface of the windshield 104.

In some embodiments, the windshield wiper system 100 includes a container 120 containing a liquid fluid (e.g., washer fluid) and a pump (not shown). The container 120 can be coupled to a liquid line 122 that affords for the liquid to be forced through one or more spray nozzles or jets 124A and 124B. In the example of FIG. 1, the spray nozzles 124A and 124B are provided in a cowl 106 of the vehicle; however, the spray nozzles 124A and 124B can be provided at other locations, such as but not limited to, on the windshield wiper assemblies 110A and 110B. In this manner, the liquid can be sprayed onto the windshield 104. An ECU 150 may operate to supply a washer control signal over a communication line 126 to energize the pump so to cause the liquid to be sprayed onto the windshield 104.

The windshield wiper system 100 further includes a first one or more gas nozzles 130A and a second one or more gas nozzles 130B disposed on the windshield wiper assemblies 110A and 110B, respectively. In some examples, each windshield wiper assemblies 110A and 110B can comprise at least one gas nozzle 130A and at least one gas nozzle 130B, respectively, disposed at on the windshield wiper arms 114A and 114B, respectively. In one example, the gas nozzles 130A and 130B can be provided at the distal end of the windshield wiper arms 114A and 114B to which the elastomer blades 112A and 112B are coupled. In some examples, the gas nozzles 130A and 130B can be provided on a first side (or upper side facing away from cowl 106 in the example of FIG. 1) of windshield wiper arms 114A and 114B. In another example, the gas nozzles 130A and 113B may be provided an a second side (or lower side facing toward cowl 106 in the example of FIG. 1). In some examples, each windshield wiper assembly 110A and 110B may comprise a first plurality of gas nozzles 130A and a second plurality of gas nozzles 130B, which can be provided on the same or different sides of the respective windshield wiper assembly 110A and 110B.

In some examples, first and second one or more gas nozzles 130A and 130B may be operatively connected to and operated vis-à-vis actuators 132A and 132B, respectively, respectively. In this case, ECU 150 may operate control the actuators 132A and 132B so to cause the actuators 132A and 132B to change an orientation of the one or more gas nozzles 130A and 130B, respectively. As a result, the one or more gas nozzles 130A and 130B can be directed to various areas of the windshield 104 according to the needs and characteristics of the vehicle. In an example, communications lines 126A and 126B may represent multiple communications lines, where communication lines are provided for operating actuators 116A and 116B and communication lines provided for operating actuators 132A and 132B are feed along respective windshield wiper arms 114A and 114B.

The windshield wiper system 100 further includes a compressor or pump 136 operable to force gas 138A and 138B, such as but not limited to, air, through a gas line 140 and out from the one or more gas nozzles 130A and 130B. The compressor or pump 136 can be activated by a ECU 150 according to a gas control signal supplied over communication line 142 so to energize compressor/pump 136 and force gas 138A and 138B out of the one or more gas nozzles 130A and 130B. As will be discussed below, the ECU 150 can control the compressor/pump 136 so to force gas through one or more gas nozzles 130A and 130B at varying pressures, flow rates, and/or velocity based on to the operating characteristics of the vehicle. As such, the ECU 150 can be operated to selectively expel gas out from the one or more gas nozzles 130A and 130B so to direct or fluid on the surface of the windshield into a desired direction, such as away from driver side A-pillar 108A and/or away from passenger side A-pillar 108B of the vehicle and thereby reducing runoff and overflow as discussed above.

In some embodiments, windshield wiper system 100 can be configured so to output gas from the one or more gas nozzles 130A and 130B at differing gas flow parameters. For example, windshield wiper system 100 can be operated such that one or more gas nozzles 130A output a first volume of gas, while one or more gas nozzles 130B output a second volume of gas that is different from the first volume. As another example, windshield wiper system 100 can be operated such that one or more gas nozzles 130A output gas at a first flow rate and/or first pressure, while one or more gas nozzles 130B output gas at a second flow rate and/or second pressure. These examples can be utilized to vary operation of the gas nozzle depending on the amount of fluid, debris, etc. that is present in a first region over which the windshield wiper assembly 110A travels as compared to the amount present in a second region over which the windshield wiper assembly 110B travels. That is, larger volumes of gas, flow rates, pressures can be applied to one region to remove larger quantities of fluid, debris, etc., whereas less volume, flow rate, pressure may be needed in another region due to lesser quantities of fluid, debris, etc.

In one example, windshield wiper system 100 can comprises a switch 144 operable to vary an amount of gas supplied from pump 136 to each of the one or more gas nozzles 130A and 130B. For example, compressor/pump 136 may force the gas through gas line 140 to switch 144, which may selectively supply gas to gas lines 140A and 140B based on the operating characteristics of the windshield. The ECU 150 may operate to control the switch 144 via communication line 146 so to cause the switch 144 to change volume, flow rates, and/or pressures of gas supplied to gas lines 140A and 140B according to operating characteristics of the windshield. In another example discussed below in connection with FIG. 4C, compressor/pump 136 may be provided as a plurality of compressors/pumps, each of which can be selectively controlled by the ECU 150 to force gas through a corresponding gas line and output from a corresponding one or more gas nozzles according to the operating characteristics of the windshield.

As alluded to above, ECU 150 can be in communicatively coupled to container 120, compressor/pump 136, actuators 116A and 116B, and actuators 132A and 132. In some cases, communicative coupling can be provided by a wired/electrical connection, while in other cases the communicative coupling may be by a wireless communication interface. In the example of FIG. 1, the communicative coupling is shown as communication lines 126, 146, 126A, 126B, and 146.

As alluded to above, windshield wiper system 100 may include an ECU 150. ECU 150 may include circuitry to control various aspects of operation. ECU 150 may include, for example, a microcomputer that includes a one or more processing units (e.g., microprocessors), memory storage (e.g., RAM, ROM, etc.), and I/O devices. The processing units of ECU 150, execute instructions stored in memory to control one or more electrical systems or subsystems in the vehicle. ECU 150 can include a plurality of electronic control units such as, for example, an electronic engine control module, a powertrain control module, a transmission control module, a suspension control module, a body control module, and so on. As a further example, electronic control units can be included to control systems and functions such as windshield wiper system, as well as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, ECU 150 receives information from a plurality of sensors 152 included in the vehicle 102, which may be used to track operating conditions or characteristics of the vehicle 102 and/or windshield 104. For example, ECU 150 may receive signals that indicate vehicle operating conditions or characteristics, or signals that can be used to derive vehicle operating conditions or characteristics. These may include, but are not limited to presence and/or amount of liquid (e.g., rain, washer fluid, etc.) on the windshield 104, position and/or direction of travel of windshield wiper assemblies 110A and 110B. Other example vehicle operating conditions or characteristics can include, but are not limited to, accelerator operation amount, ACC, a revolution speed, NE, of an internal combustion engine (engine RPM), a rotational speed, NMG, of a motor (motor rotational speed), and vehicle speed, NV. Accordingly, windshield wiper system 100 can include a plurality of sensors 152 that can be used to detect various conditions internal or external to the vehicle and provide sensed conditions to ECU 150 (which, again, may be implemented as one or a plurality of individual control circuits).

In some embodiments, one or more of the sensors 152 may include their own processing capability to compute the results for additional information that can be provided to ECU 150. In other embodiments, one or more sensors may be data-gathering-only sensors that provide only raw data to ECU 150. In further embodiments, hybrid sensors may be included that provide a combination of raw data and processed data to ECU 150. Sensors 152 may provide an analog output or a digital output.

Sensors 152 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect objects in an environment surrounding vehicle 102, for example, traffic signs indicating a current speed limit, road curvature, obstacles, surrounding vehicles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as one example of systems with which embodiments of the disclosed technology may be implemented. One of ordinary skill in the art reading this description will understand how the disclosed embodiments can be implemented with this and other vehicle platforms.

Furthermore, while FIG. 1 depicts a front windshield and a windshield wiper system 100 comprising two windshield wiper assemblies, embodiments disclosed herein are not limited to this configuration. Windshield wiper system 100 may comprise fewer or more than two windshield wiper assemblies. For example, windshield wiper system 100 may include a third windshield wiper assembly positioned on a rear windshield, with the distal end adjacent to either an upper or lower edge of the rear windshield. The third windshield wiper assembly may be substantially similar to windshield wiper assembly 110A and driven by ECU 150. One or more gas nozzles may be disposed on the third windshield wiper assembly as described above, which can be used to expel gas provided by the compressor/pump 136 and/or a separate compressor/pump. Further, a spray nozzle may be provided as is known in the art for spraying liquid onto the rear windshield.

Figure 2:
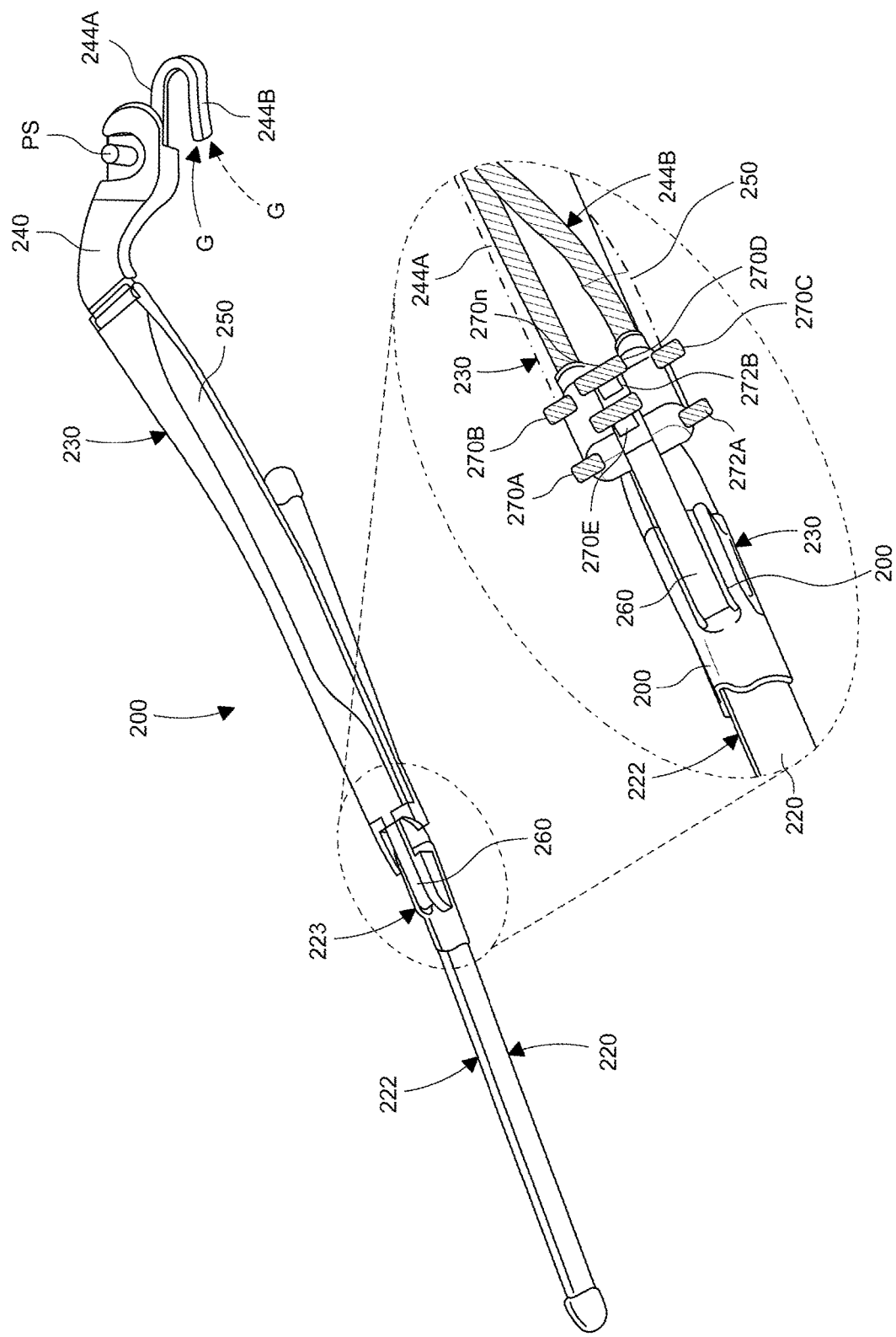
FIG. 2 is a schematic illustration of an example windshield wiper assembly according to embodiments of the presently disclosed technology.

FIG. 2 is a schematic illustration of an example windshield wiper assembly 200 according to embodiments of the presently disclosed technology. Windshield wiper assembly 200 of FIG. 2 can be implemented as any of the windshield wiper assemblies discussed above in connection with FIG. 1, for example, as windshield wiper assembly 110A and/or windshield wiper assembly 110B.

Windshield wiper assembly 200 includes an elastomer blade 220 and a windshield wiper arm 230. The blade 220 is rotatably fitted to the distal end 231 of the windshield wiper arm 230 and moves in slidable contact with a windshield (not shown in FIG. 2). The proximal end 232 of the windshield wiper arm 230 is provided on a pivot shaft PS coupled to an actuator (such as one of actuators 116A or 116B) for moving the windshield wiper arm 230. The windshield wiper arm 230 is rotatable about the pivot shaft PS, which serves as a central axis around which the blade 220 slides or is dragged across the windshield. As a result, the windshield wiper arm 230 rotates and causes the blade 220 to travel along a first path in a first (or forward) direction toward an upper edge of the windshield and along a second path in a second direction (or backward) direction toward the lower edge of the windshield over a wiping area on the windshield.

The blade 220 has a blade rubber 221 which is can contact the windshield, a frame 222 holding the blade rubber 221, and a connecting member 223 for removably attaching the blade 220 to the windshield wiper arm 230. The blade rubber 221 can be formed of elastic material such as rubber.

The connecting member 223 can be provided at approximately a middle area of the frame 222. The connecting member 223 can be provided having a structure having an interlocking mechanism (not shown) for receiving an arm connector 260 so to rotatable couple the blade 220 to the windshield wiper arm 230.

The windshield wiper arm 230 has an arm head 240 at the proximal end 232, the arm connector 260 at the distal end 231, and an arm shank 250 extending therebetween. The arm head 240 can be removably fixed to the pivot shaft PS so to transfer rotational movement to the windshield wiper arm 230 and the arm shank 250 can be rotatably attached to the arm head 240. The arm piece 60 is fixed to the distal end 231 of the arm shank 50 and comprises a substantially into a "U" shaped structure for interlocking with connecting member 223 of the blade 220, for example, through a hooked connection.

The windshield wiper assembly 200 also includes one or more gas lines 244 that traverses the length of the windshield wiper arm 230 to the arm connector 260. The gas line 244 may be implemented as any one of gas line 140, 140A, and/or 140B and may be coupled to compressor/pump 136. In the example of FIG. 2, two gas lines 244A and 244B are provided; however, fewer or more gas lines may be provided depending on the implementation.

FIG. 2 also depicts an enlarged view of the windshield wiper assembly 200 with the arm shank 250 removed so to depict the gas lines 244 housed therein. For example, the arm shank 250 houses the gas lines 244 within a recessed region such that the gas lines 244 traverse the length of the arm shank 250. The gas lines 244 are coupled to one or more gas nozzles 270A-270N disposed at the distal end 231 the of the windshield wiper arm 230 on the arm connector 260. In the example of FIG. 2, two gas lines 244A and 244B are provided that can be separately utilized to expel gas from a subset of the gas nozzles 270A-270N illustratively shown in FIG. 2.

As illustrated in FIG. 2, windshield wiper assembly 200 includes one or more gas nozzles for outputting gas from gas lines 244. In the illustrative example of FIG. 2, two gas nozzles 270A and 270B are provided on a first side (upper side) of the windshield wiper assembly 200; two gas nozzles 270C and 270D are provided on second (lower side) of windshield wiper assembly 200, and two gas nozzles 270E and 270N are provided on a outer facing surface of the windshield wiper assembly 200 (e.g., a surface of the arm connector 260 facing opposite the windshield and extending from the first side to the second side). While the example of FIG. 2 shows six gas nozzles, embodiments disclosed herein can include any number of gas nozzles as desired, for example, 1, 2, 3, 4, 5, 6, 7, 8, etc. Furthermore, while the gas nozzles 270 are illustrated as disposed on the arm connector 260, gas nozzles may be disposed at any desired position of the windshield wiper assembly 200. For example, one or more gas nozzles 270 can be provided along the length of the arm shank 250, at the arm head 240 and facing in any desired direction. As another example, gas nozzles may be positioned along the blade 220, for example, at one or more positions of the frame 222.

In the illustrative example of FIG. 2, nozzles 270E and 270N are coupled to actuators 272A and 272B, which can be controlled to change an orientation of the nozzles. For example, nozzles 270E and 270N may be rotated by actuators 272A and 272B about a rotation axis that extends perpendicular to the windshield. The actuators 272A and 272B may be examples of actuator 132A and/or 132B. While not shown in FIG. 2, any of gas nozzles 270 may be coupled to a corresponding actuator as desired.

Figure 3:
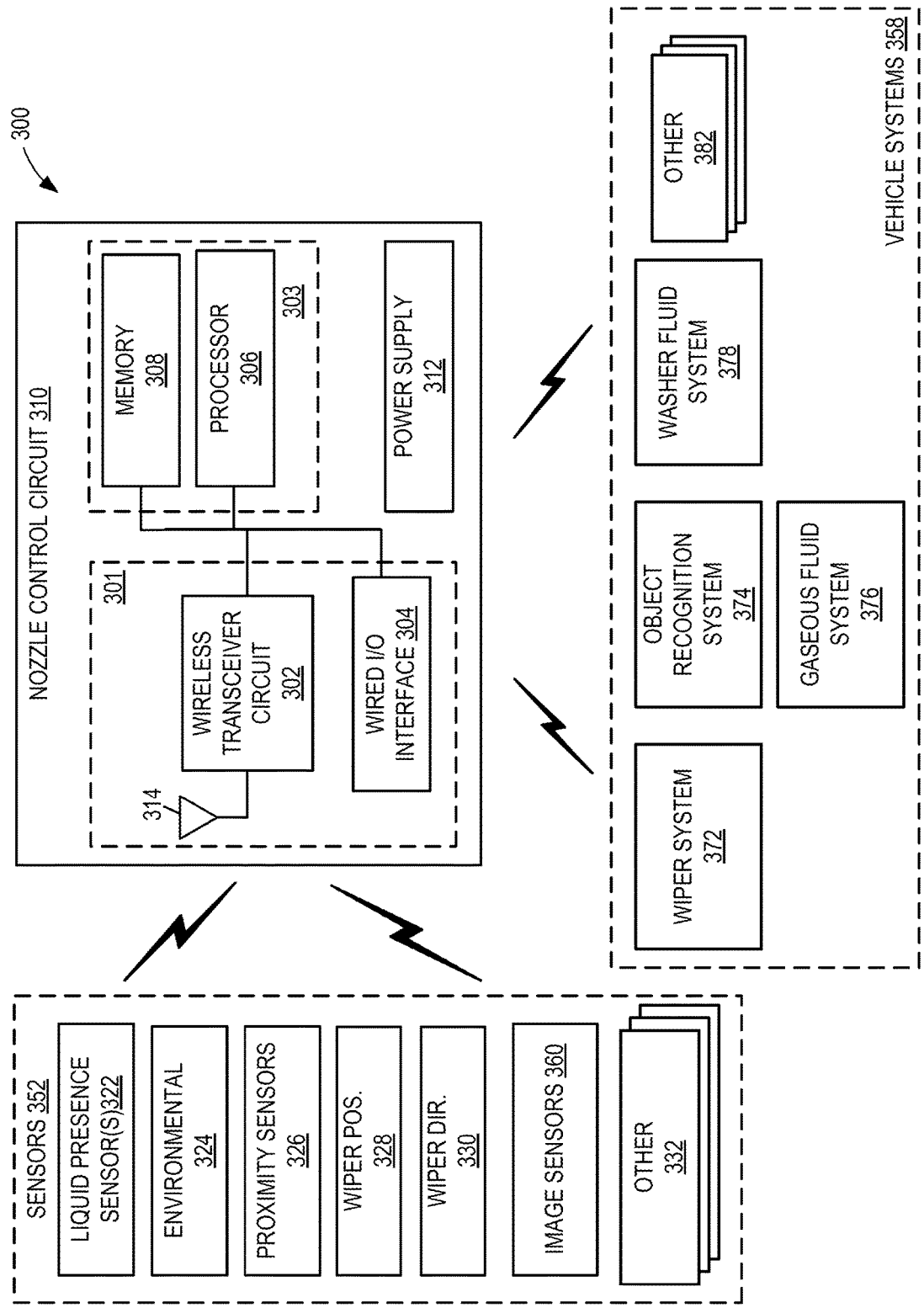
FIG. 3 illustrates an example architecture for controlling the output of gas in accordance with one embodiment of the systems and methods described herein.

FIG. 3 illustrates an example architecture for controlling the output of gas in accordance with one embodiment of the systems and methods described herein. Referring now to FIG. 3, in this example, nozzle control system 300 includes a nozzle control circuit 310, a plurality of sensors 352 and a plurality of vehicle systems 358. Sensors 352 (such as sensors 152 described in connection with FIG. 1) and vehicle systems 358 can communicate with nozzle control circuit 310 via a wired or wireless communication interface. Although sensors 352 and vehicle systems 358 are depicted as communicating with nozzle control circuit 310, they can also communicate with each other as well as with other vehicle systems. nozzle control circuit 310 can be implemented as an ECU or as part of an ECU such as, for example ECU 150. In other embodiments, nozzle control circuit 310 can be implemented independently of the ECU.

Nozzle control circuit 310 in this example includes a communication circuit 301, a decision circuit 303 (including a processor 306 and memory 308 in this example) and a power supply 312. Components of nozzle control circuit 310 are illustrated as communicating with each other via a data bus, although other communication in interfaces can be included.

Processor 306 can include one or more GPUs, CPUs, microprocessors, or any other suitable processing system. Processor 306 may include a single core or multicore processors. The memory 308 may include one or more various forms of memory or data storage (e.g., flash, RAM, etc.) that may be used to store instructions and variables for processor 306 as well as any other suitable information, such as, one or more of the following elements: windshield wiper position data; fluid detection data, along with other data as needed. Memory 308 can be made up of one or more modules of one or more different types of memory, and may be configured to store data and other information as well as operational instructions that may be used by the processor 306 to nozzle control circuit 310.

Although the example of FIG. 3 is illustrated using processor and memory circuitry, as described below with reference to circuits disclosed herein, decision circuit 303 can be implemented utilizing any form of circuitry including, for example, hardware, software, or a combination thereof. By way of further example, one or more processors, controllers, ASICs, PLAS, PALs, CPLDs, FPGAs, logical components, software routines or other mechanisms might be implemented to make up a nozzle control circuit 310.

Communication circuit 301 includes either or both a wireless transceiver circuit 302 with an associated antenna 314 and a wired I/O interface 304 with an associated hardwired data port (not illustrated).

Wireless transceiver circuit 302 can include a transmitter and a receiver (not shown) to allow wireless communications via any of a number of communication protocols such as, for example, Wi-Fi, Bluetooth, near field communications (NFC), Zigbee, and any of a number of other wireless communication protocols whether standardized, proprietary, open, point-to-point, networked or otherwise. Antenna 314 is coupled to wireless transceiver circuit 302 and is used by wireless transceiver circuit 302 to transmit radio signals wirelessly to wireless equipment with which it is connected and to receive radio signals as well. These RF signals can include information of almost any sort that is sent or received by nozzle control circuit 310 to/from other entities such as sensors 352 and vehicle systems 358.

Wired I/O interface 304 can include a transmitter and a receiver (not shown) for hardwired communications with other devices. For example, wired I/O interface 304 can provide a hardwired interface to other components, including sensors 352 and vehicle systems 358. Wired I/O interface 304 can communicate with other devices using Ethernet or any of a number of other wired communication protocols whether standardized, proprietary, open, point-to-point, networked or otherwise.

Power supply 312 can include one or more of a battery or batteries (such as, e.g., Li-ion, Li-Polymer, NiMH, NiCd, NiZn, and NiH2, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 352 can include, for example, sensors 152 such as those described above with reference to the example of FIG. 1. Sensors 352 can include additional sensors that may or may not otherwise be included on a standard vehicle with which the nozzle control system 300 is implemented. In the illustrated example, sensors 352 include liquid presence sensor(s) 322 for detecting a presence of liquid (e.g., rain, wiper fluid, etc.) on a windshield or other windows, environmental sensors 324 (e.g., to detect salinity or other environmental conditions), proximity sensor 326 (e.g., sonar, radar, lidar or other vehicle proximity sensors), wiper position sensors 324 to detect a position of a wiper blade with respect to the windshield, wiper direction sensors 326 to detect a direction of travel of the wiper blades. The liquid presence sensor(s) 322 can also be configured to detect an amount of moisture or liquid present on the windshield. Additional sensors 324 can also be included as may be appropriate for a given implementation of nozzle control system 300.

System 300 may be equipped with one or more image sensors 360. These may include front facing image sensors, side facing image sensors, and/or rear facing image sensors. Image sensors may capture information which may be used in detecting not only vehicle conditions but also detecting conditions external to the vehicle as well. Image sensors that might be used to detect external conditions can include, for example, cameras or other image sensors configured to capture data in the form of sequential image frames forming a video in the visible spectrum, near infra-red (IR) spectrum, IR spectrum, ultra violet spectrum, etc. Image sensors 360 can be used to, for example, to detect windshield wipers on a windshield (such as, but not limited to, a front and/or rear windshield) of a vehicle comprising nozzle control system 300. Object detection and recognition techniques may be used to detect windshield wipers and positions of the detected windshield wipers relative to the windshield. In another example, image sensors 360 may be used to detect an amount of fluid on the windshield, for example, by using image data to recognize fluid and/or rain drops. The image sensors 360 may include cameras that may be used with and/or integrated with other proximity sensors 330, such as radar and/or LIDAR sensors or any other sensors capable of recognizing objections in a field of view.

Vehicle systems 358, for example, systems and subsystems 158 described above with reference to the example of FIG. 1, can include any of a number of different vehicle components or subsystems used to control or monitor various aspects of the vehicle and its performance. In this example, the vehicle systems 358 includes a wiper system 372 that can use data from the liquid presence sensor 322 or other sensors 352 to automatically activate windshield wipers upon detecting fluid on the windshield, such as when the amount of fluid exceeds a threshold. Vehicle systems 358 may also include an object recognition system 374 configured to perform object detection and/or object recognition. Object recognition system 374 may be leveraged, for example, to detect a position of windshields wipers relative to the windshield. Vehicle systems 358 can also include a gas system 376 forcing gas through gas lines. For example, gas system 376 may include pump 136 and gas lines of FIG. 1 for forcing gas from gas nozzles 130A and 130B according to control exerted by nozzle control circuit 310. Vehicle systems 358 may also include a washer fluid system 378 for spraying washer fluid onto the windshield, such as from container 120 of FIG. 1. Vehicle systems 358 can also include other vehicle systems 382 (e.g., vehicle positioning system; autonomous or semi-autonomous driving systems; Advanced Driver-Assistance Systems (ADAS), such as forward/rear collision detection and warning systems, pedestrian detection systems; and the like).

During operation, nozzle control circuit 310 can receive information from various vehicle sensors 352 and/or systems 358 to determine in what manner to control outputting of gas dependent on the operating characteristics (e.g., needs) of the vehicle as defined by the sensor data and/or system 358. Communication circuit 301 can be used to transmit and receive information between nozzle control circuit 310 and sensors 352, and between nozzle control circuit 310 and vehicle systems 358. Also, sensors 352 may communicate with vehicle systems 358 directly or indirectly (e.g., via communication circuit 301 or otherwise).

In various embodiments, communication circuit 301 can be configured to receive data and other information from sensors 352 that is used in determining in what manner to output of gas and/or wiper fluid (e.g., how to control nozzles). Additionally, communication circuit 301 can be used to send a control signals or other control information to gas system for controlling the one or more gas nozzles to output of gas and according to the operating conditions and characteristics of the vehicle. For example, communication circuit 301 can be used to send control signals to gas nozzles to control one or more of: a direction at which the gas and/or wiper fluid is output from the one or more nozzles; an orientation of the one or more gas nozzles; a volume or amount of gas emitted from the one or more gas nozzles; a flow rate of gas from the one or more gas nozzles; a pressure of the gas from the one or more gas nozzles; and a velocity of gas from one or more gas nozzles. As another example, communication circuit 301 can be used to send a control signals or other control information to washer fluid system for controlling spray nozzles to output of washer fluid and according to the operating conditions and characteristics of the vehicle. The decision regarding what action nozzle control circuit 310 causes the one or more gas nozzles to take can be made based on the information supplied by sensors 352 and/or systems 358. Examples of this are described in more detail below.

FIGS. 4A-4D illustrate example operations of the windshield wiper system 100 in accordance with embodiments disclosed of the presently disclosed technology. FIGS. 4A-4D depict windshield wiper system 100 as described above in connection with FIG. 1, with the spray nozzles 124A, liquid line 122, and container 120 removed for illustrative purposes. While these elements are not depicted in FIGS. 4A-4D, it will be understood that these elements can be included as described above and utilized for spraying washer fluid onto windshield 104 as discussed herein.

In the embodiments disclosed here, ECU 150 may comprise nozzle control circuit 310 discussed above in connection with FIG. 3. ECU 150 may receive information from sensors 152, which may be implemented as one or more of sensors 352 discussed above in connection with FIG. 3. Accordingly, based on the information from sensors 152, ECU 150 may be configured to control windshield wiper system 100 to clear the windshield of excess fluid while reducing runoff and/or overflow.

Figure 4A:
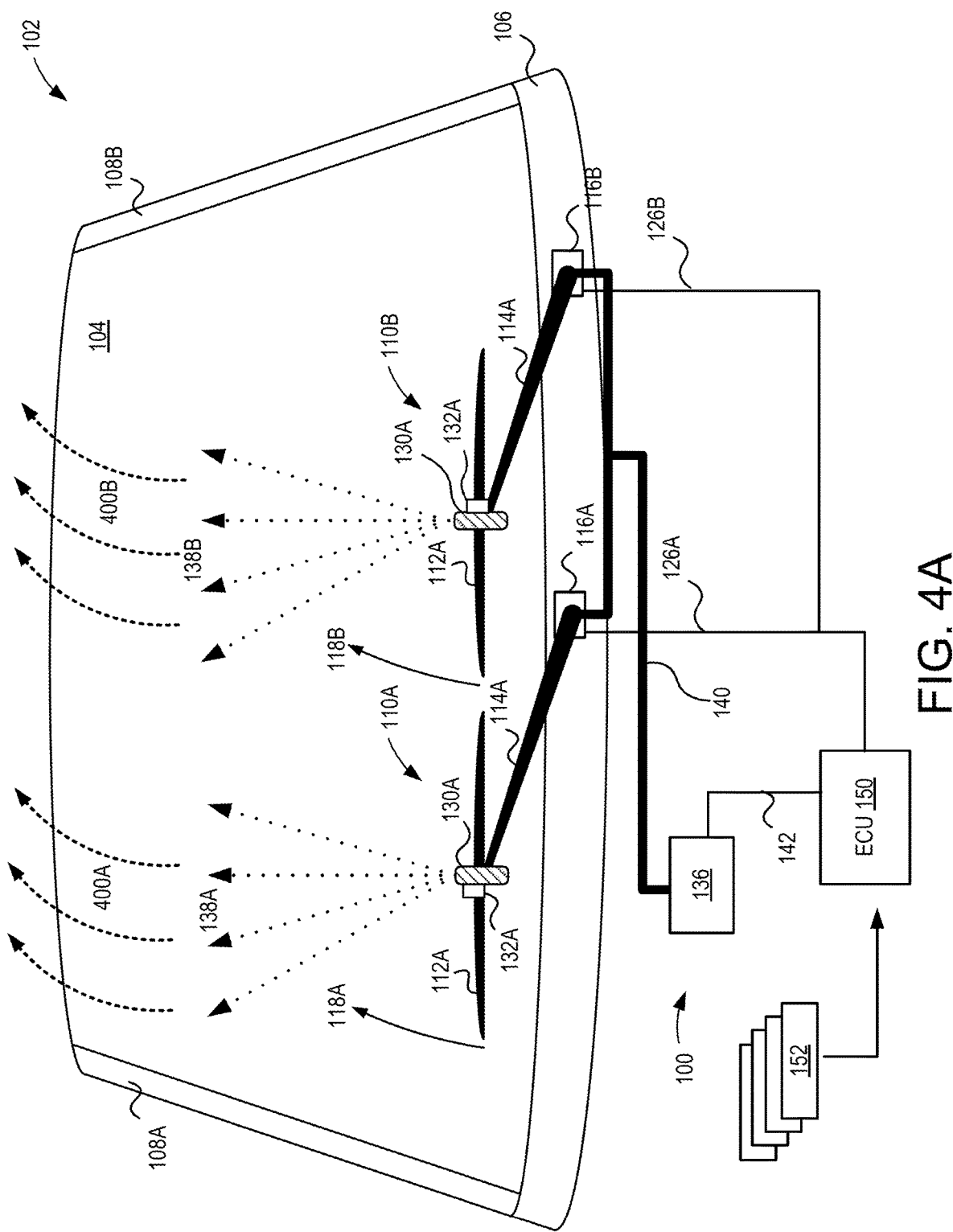
FIGS. 4A-4D illustrate example operations of the windshield wiper system of FIG. 1 in accordance with embodiments disclosed of the presently disclosed technology.

In one example, with reference to FIG. 4A, ECU 150 can be configured to determine a position and/or direction of travel of the blades 112A and/or 112B on the surface of the windshield 104 and control the one or more nozzles based on the determined position and/or direction. For example, sensors 152 may supply information (also referred to as sensor data) in the form of image data from image sensors 360 or radar/LiDAR data from proximity sensor 326 of a field of view of the windshield 104. The sensor data may be used by object recognition system 374 to determine a position of blades 112A and/or 112B on the windshield, along with a direction of travel along paths 118A and/or 118B. In another example, sensor data may include position information indicating an angle of rotation and direction executed by actuators 116A and/or 116B, from which ECU 150 can then derive a position and travel direction of the blades 112A and/or 112B based on rotational movement applied to arms 114A and/or 114B.

Based on the determined position and/or location, ECU 150 can be configured to selectively control compressor/pump 136 to force gas 138A and/or 138B out from the one or more gas nozzles 130A and/or 130B. For example, based on sensor data the ECU 150 may determine that the blade 112A is positioned adjacent to a bottom edge of the windshield 104 (e.g., near the cowl 106) and that the blade 112A is moving in a first (or forward) direction towards a upper edge of the windshield 104. Responsive to this determination, ECU 150 can be configured to control the compressor/pump 136 to output gas 138A from the one or more gas nozzles 130A toward the upper edge, as shown in FIG. 4A. As a result, any excess fluid 400A on the windshield can be redirected toward the upper edge of the windshield 104 and possibly above the windshield wiper system 100. Similarly, ECU 150 can be configured to control pump 136 to output gas 138B from one or more gas nozzles 130B so to redirect excess fluid 400B.

In another example, additionally or alternatively, when the above conditions exist, ECU 150 may cause the one or more gas nozzles 130A and/or 130B to output gas 138A and/or 138B in a direction toward an end of the blades 112A and/or 112B. For example, gas nozzles 130A may be positioned so to expel gas along a length of the blade 112A away from the driver side A-pillar 108A, and the ECU 150 may cause gas to be output along the length of the blade 112A away from driver side A-pillar 108A responsive to the determined position and/or location. In some embodiments, ECU 150 may control actuators 116A to change an orientation of one or more gas nozzles 130A by rotating the one or more gas nozzles 130A from a direction as shown in FIG. 4A to a direction along the length of the blade 112A so as to expel gas in the desired direction. Similar operation can be performed on one or more gas nozzles 130B as desired.

Figure 4B:
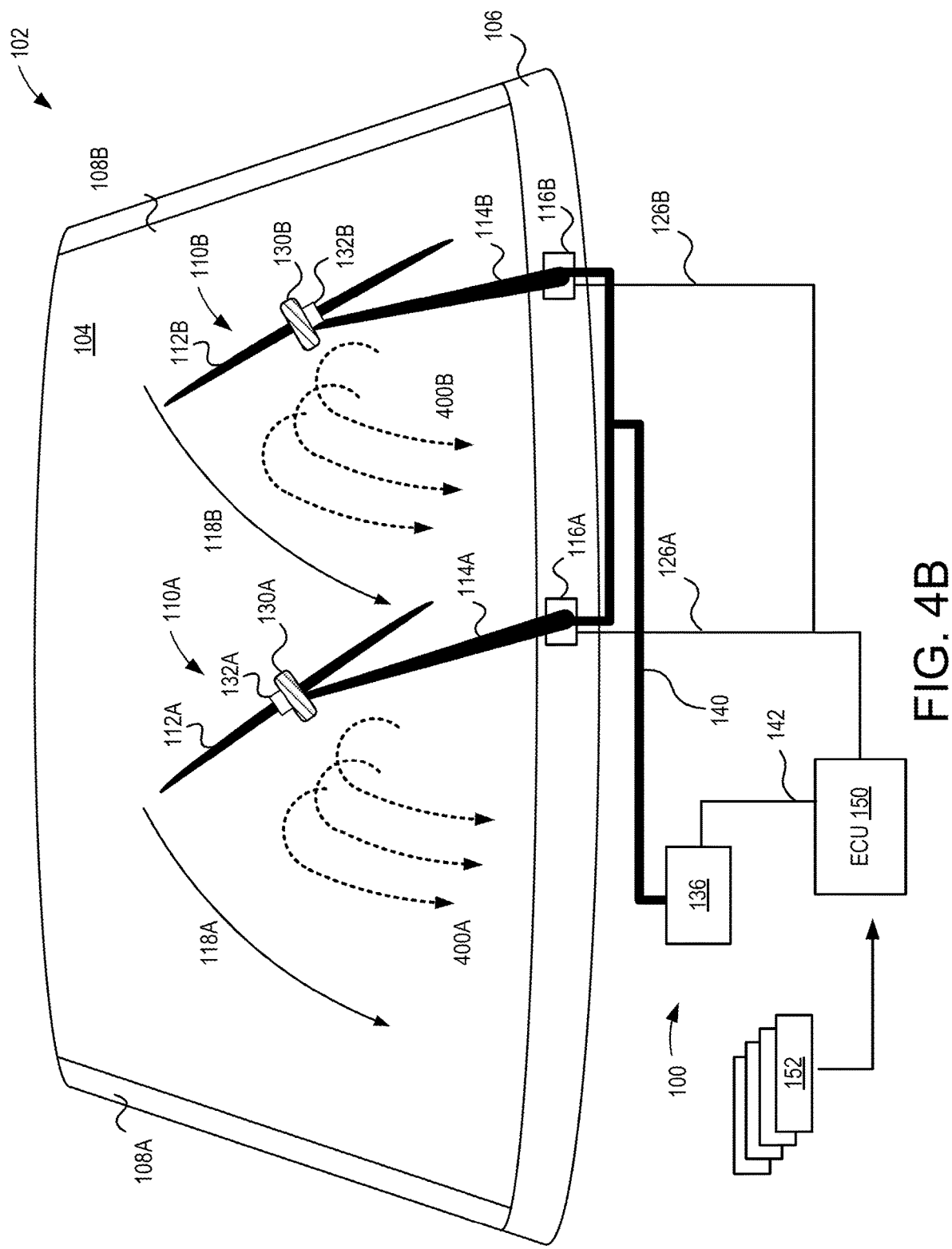

In another example, as shown in FIG. 4B, ECU 150 may determine that the blade 112A is in a upper position (e.g., an end of the blade 112A is adjacent to the upper edge of the windshield 104) and that the blade 112A is moving in a second (or backward) direction towards the lower edge of the windshield 104. Responsive to this determination, ECU 150 can be configured to control the compressor/pump 136 so to direct excess fluid 400A on the windshield downward toward the bottom edge of windshield 104. In one example, as shown in FIG. 4B, the one or more gas nozzles 130A may be controlled so to not output gas, thereby allowing blade 112A to wipe fluid 400A toward the bottom edge of windshield 104. One or more gas nozzles 130B may be similarly controlled to so permit blade 112B to wipe fluid 400B. In a case where washer fluid is sprayed (e.g., due to operation of spray nozzle 124A) onto the windshield 104, this example permits washer fluid to be sprayed and then wiped downward by the blades 112A and/or 112B, without fluid being blown in an undesired direction by output gas. However, some examples may be implemented to permit gas to be expelled by one or more gas nozzles 130A and/or 130B so as to direct the fluid as desired.

In some embodiments, ECU 150 may be configured vary output parameters (e.g., the volume of gas, flow rate, etc.) of gas expelled the one or more gas nozzles 130A and/or 130B. That is, in one example, one or more gas nozzles 130B may be controlled to expel gas 138B at a first flow rate and/or expel a first volume of gas 138B, while one or more gas nozzles 130A may be controlled to expel gas 138A at a second flow rate and/or expel a second volume of gas 138B. The first volume and/or first flow rate may be different from the second volume and/or flow rate, respectively.

Figure 4C:
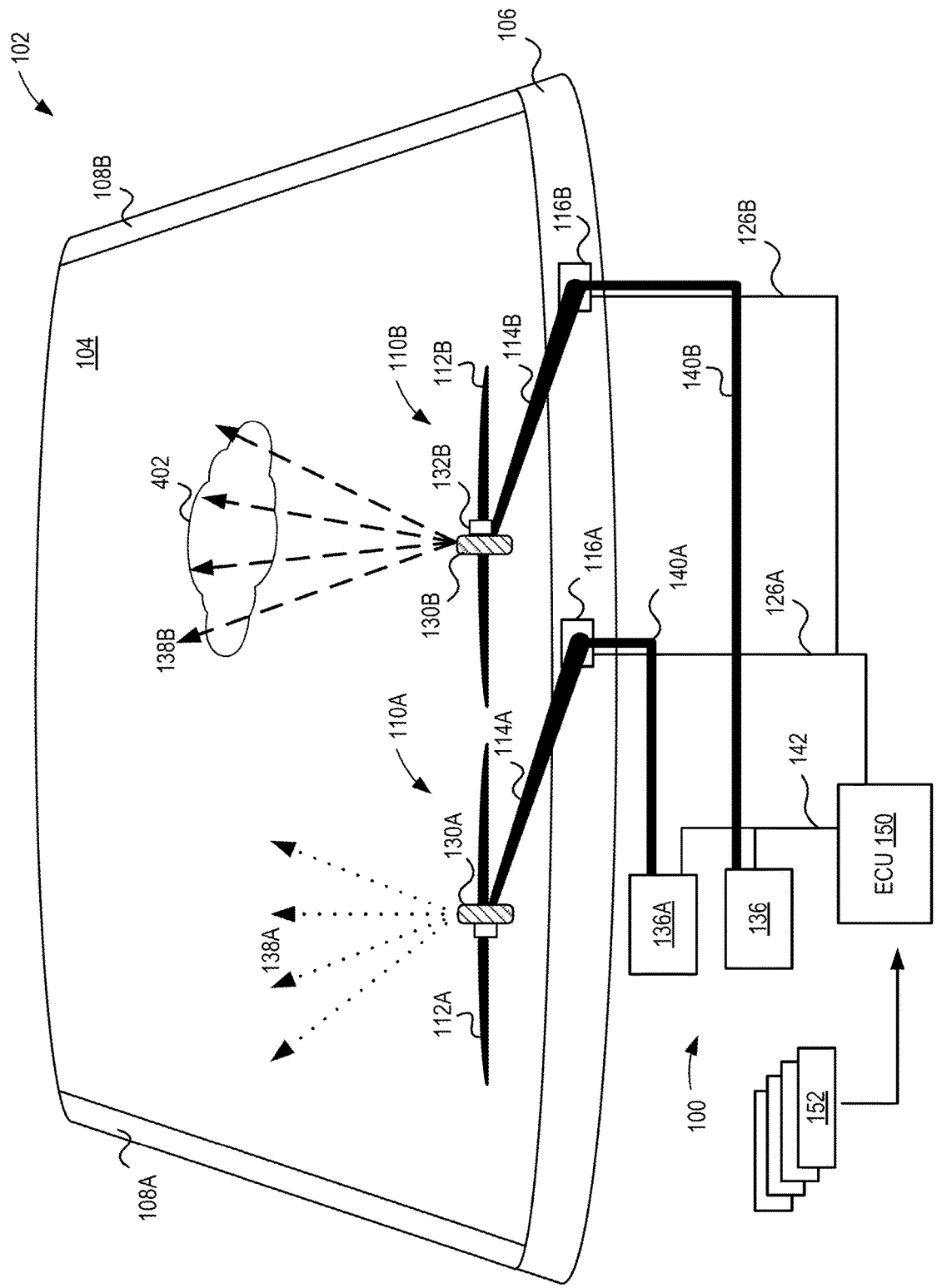

FIG. 4C illustrates an example implementation of varying output parameters, where one or more gas nozzles 130B is expelling gas 138B at an output parameter that is larger than one or more gas nozzles 130A is outputting gas 138A. For example, ECU 150 may detect liquid (e.g., rain and/or washer fluid) and/or debris (shown in FIG. 4C as liquid 402) on the windshield 104 based on sensor data from sensors 152 (e.g., liquid presence sensor(s) 322). Using sensor data, ECU 150 may also determine an area of windshield 104 on which liquid 402 is present and which windshield wiper assembly 110A or 110B corresponds to the determined area (e.g., which path 118A or 118B traverses the determined area). The ECU 150 may also determine an amount of liquid or debris and compare the amount to a set threshold amount. Responsive to the determined amount being below the set threshold amount, ECU 150 may cause the one or more gas nozzles to output gas, corresponding to a determined area of windshield 104, at a lower flow rate or lower volume, as shown as gas 138A in FIG. 4C. On the other hand, the ECU 150 may cause the one or more gas nozzles, corresponding to the determined area of windshield 104, to output gas at a higher flow rate or larger volume responsive to the amount of liquid being equal to or exceeding the set threshold.

Flow rate may be controlled by adjusting a volume of gas forced through gas line 140 per unit of time, adjusting a pressure at which gas forced through gas line 140, and/or adjusting the velocity at which the gas forced through gas line 140. As another example, apertures of the gas nozzles 130A and/or 130B can be controlled to constrict or increase in size so as to control pressure of the gas. Accordingly, embodiments disclosed herein can vary the volume and/or flow rate of the gas 138A and 138B between a minimum value (e.g., none) to a maximum value based on an amount of fluid (e.g., washer fluid and/or rain) detected on the windshield. The volume and/or flow rate may be proportional to the amount of fluid present on the windshield.

FIG. 4C illustrates an embodiment in which each one or more gas nozzle 130A and 130B is coupled to a corresponding compressor/pump 136A and 136B via a gas line 140A and 140B, respectively. In this case, ECU 150 may independently control each compressor/pump 136A and 136B based on the conditions detected on the windshield as discussed above. In another example, as shown in FIG. 1, the one or more gas nozzles 130A and 130B may share a common compressor/pump 136 and the ECU 150 may control a switch 144 so to vary the output parameters of the gas expelled from each one or more gas nozzles 130A and 130B.

In another example, one or more gas nozzles 130A may comprise a plurality of gas nozzles (as shown in FIG. 2). In this case, ECU 150 may be configured to vary the output parameters of the expelled gas across the plurality of gas nozzles 130A, such that each gas nozzle can output gas at differing parameters according to the conditions on the windshield. Each gas nozzle in this case can correspond to a sub-region of the area over which the blade travels. As such, the process described above for one or more gas nozzles 130A and one or more gas nozzles 130B may be replicated within a single windshield wiper assembly.

Figure 4D:
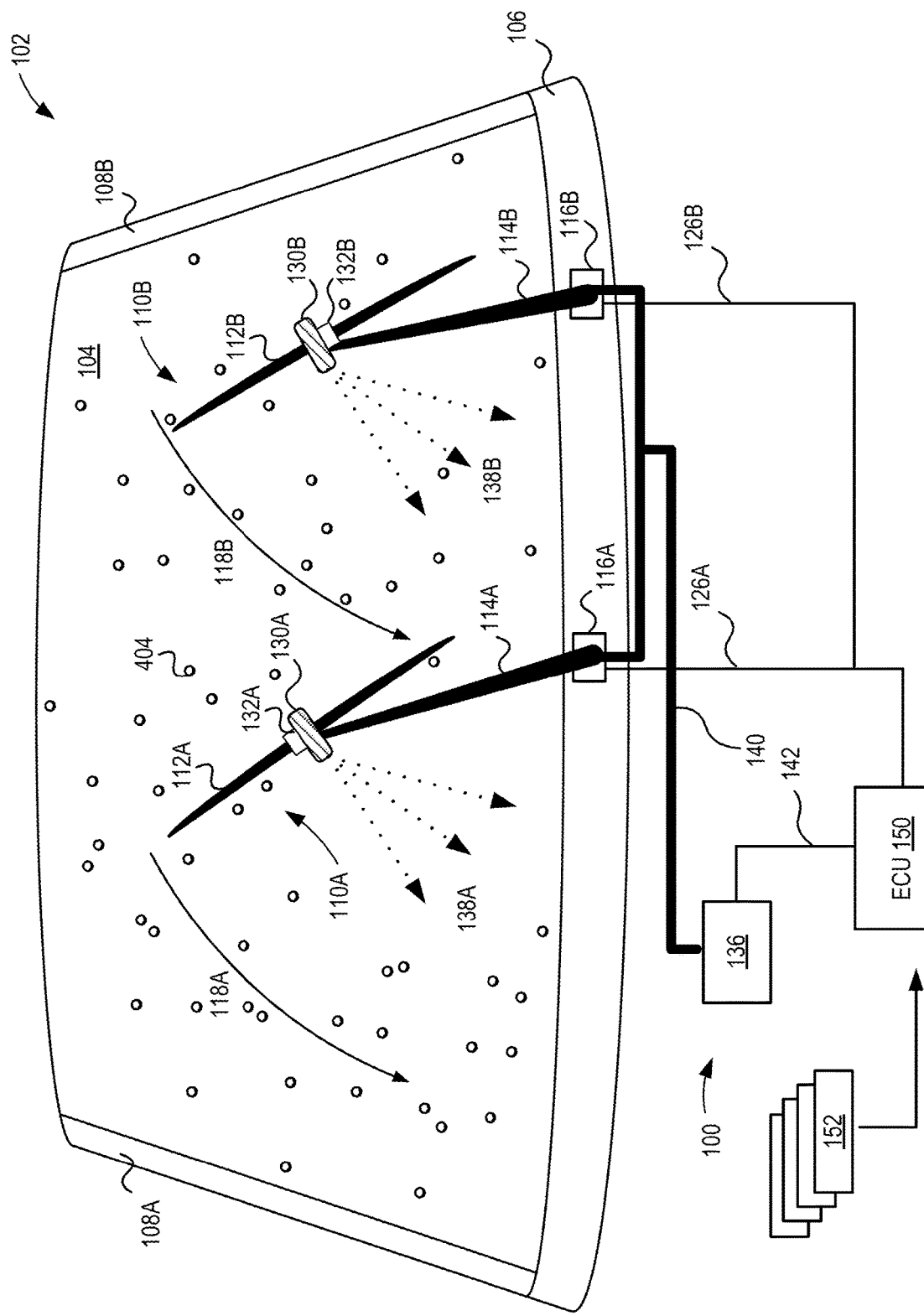

FIG. 4D depicts another operation of windshield wiper assemblies 110A and 110B where the one or more gas nozzles 130A and/or 130B can be controlled (e.g., by ECU 150) to output gas 138A and/or 138B responsive to detecting rain (shown as rain drops 404) on the windshield 104. For example, regardless of the position and/or direction of travel, ECU 150 may detect rain drops on windshield 104 and cause the one or more gas nozzles 130A and/or 130B to expel gases fluid to remove the rain from windshield 104. As an illustrative example, FIG. 4D illustrates a case where the one or more gas nozzles 130A and 130B are located on (or oriented via actuators 132A and 132B) at a second side (e.g., side facing cowl 106) of the windshield wiper arms 114A and 114B. Responsive to detecting a light raining (e.g., amount of rain detected is below a rain detection threshold), the he one or more gas nozzles 130A and one or more gas nozzles 130B may be controlled to output gas at a low output parameter as the blades 112A and 112B move down toward as shown in FIG. 4D. In a case where ECU 150 determines that there is a heavy downpour (e.g., amount of rain is above the rain detection threshold), the one or more gas nozzles 130A and one or more gas nozzles 130B may be controlled to output gas at a higher output parameter.

Moreover, as the blades 112A and 112B move up toward the top edge of the windshield 104, embodiments disclosed herein may control the nozzles to prevent the output of gas based on detected rain amounts. In one example, the one or more gas nozzles 130A and 130B may include gas nozzles on the upper side of windshield wiper arms 114A and 114B (e.g., facing the upper edge of windshield 104 in FIG. 1). In this case, while blade 112A and 112B are moving in the forward direction toward the upper edge of windshield 104, ECU 150 may cause these gas nozzles to expel gas as discussed above for FIG. 4A. In another example, actuators 132A and 132B may rotate the one or more gas nozzles 130A and 130B to change orientation so to expel gas to the desired direction.

In some embodiments, actuators 132A and 132B may continuously move the one or more gas nozzles 130A and 130B while blades 112A and 112B move along paths 118A and 118B. That is, for example, as blades 112A and 112B travel, actuators 132A and 132B may continually change the orientation of the one or more gas nozzles 130A and 130B to expel gas to a desired direction.

Figure 5:
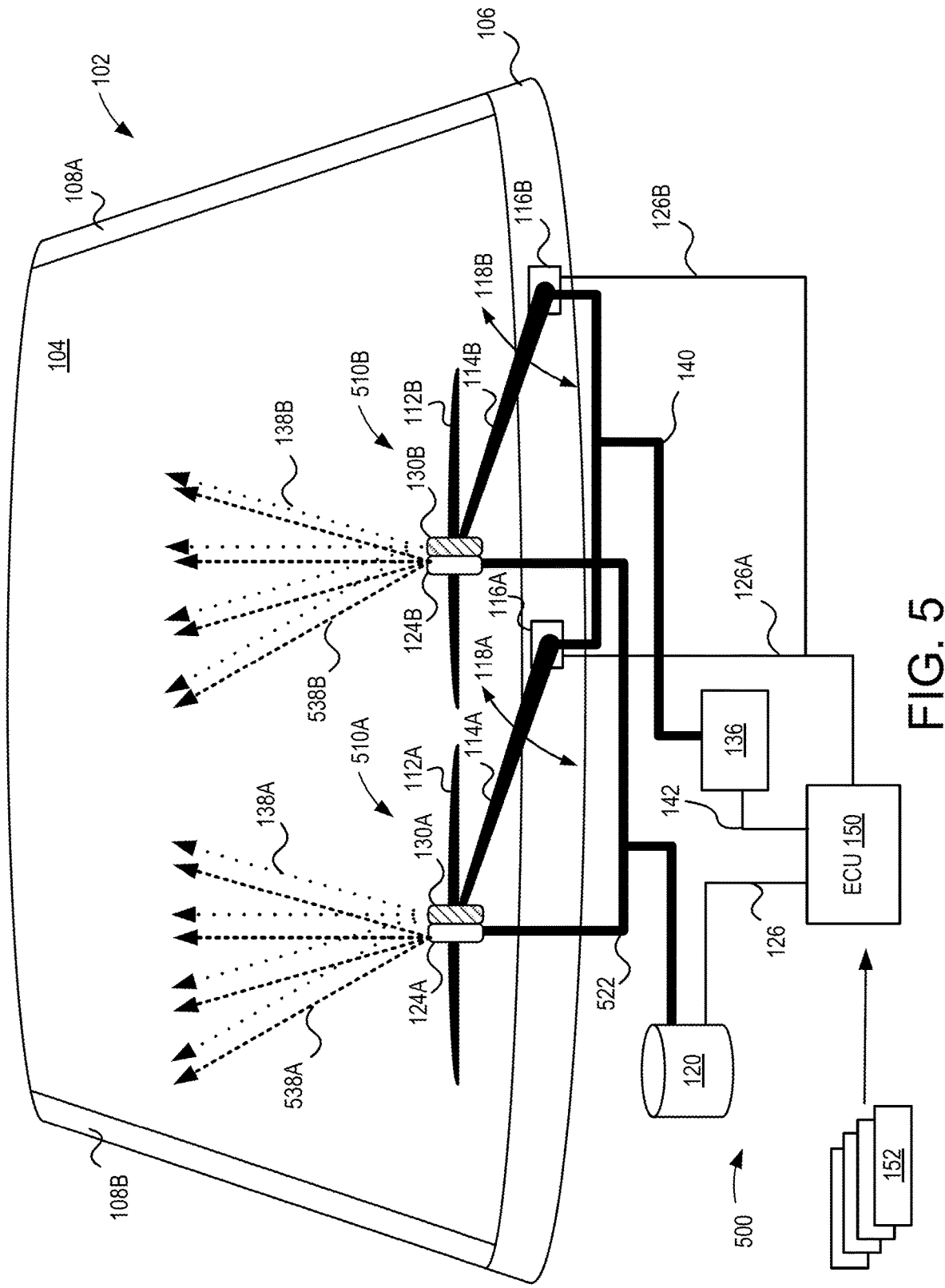
FIG. 5 is a schematic illustration of another example windshield wiper system according to an embodiment of the presently disclosed technology.

FIG. 5 is a schematic illustration of a windshield wiper system 500 according to an embodiment of the presently disclosed technology. Windshield wiper system 500 is substantially the same as windshield wiper system 100, except as provided herein. Windshield wiper system 500 includes windshield wiper assemblies 510A and 510B, which are substantially the same as windshield wiper assemblies 110A and 110B except that windshield wiper assemblies 510A and 510B comprise spray nozzles 124A and 124B disposed thereon instead of provided in cowl 106. In this case, the container 120 can be coupled to a liquid line 522 that affords for the liquid to be forced through spray nozzles 124A and 124B, where liquid line 522 is feed through the windshield wiper arms 114A, similar to gas line 140.

As such, each windshield wiper assembly 510A and 510B includes at least one spray nozzle 124A and 124B, respectively for outputting washer fluid and one or more gas nozzles 130A and 130B, respectively, for outputting gas. In this case, ECU 150 can control the spray nozzles 124A and/or 124B to output fluid according to a detection of liquid on the windshield 104 by mixing gas 138A and/or 138B with washer fluid 538A and/or 538B, respectively. That is, the ECU 150 can operate the spray nozzles 124A and/or 124B concurrently with operating the one or more gas nozzles 130A and/or 130B, respectively, so as to output both washer fluid and gas at the same time.

This configuration can result in the need for less washer fluid to clear debris on windshield 104 by leverage expelling of gas. That is, as the amount of liquid present on the windshield 104 increases, the amount of washer fluid 538A and/or 538B that needs to be sprayed to clear the debris can be decreased, while gas 138A and/or 138B expelled by the one or more gas nozzles 130A and/or 130B can be increased to assist with the removal of debris. Since the amount of washer fluid sprayed is reduced, the amount of excess fluid that could cause runoff or overflow is also reduced. Further, as discussed above, the one or more gas nozzles 130A and 130B can be controlled so to direct excess liquid on the windshield 104, thereby reducing runoff and/or overflow due to washer fluid 538A and/or 538B.

Figure 6:
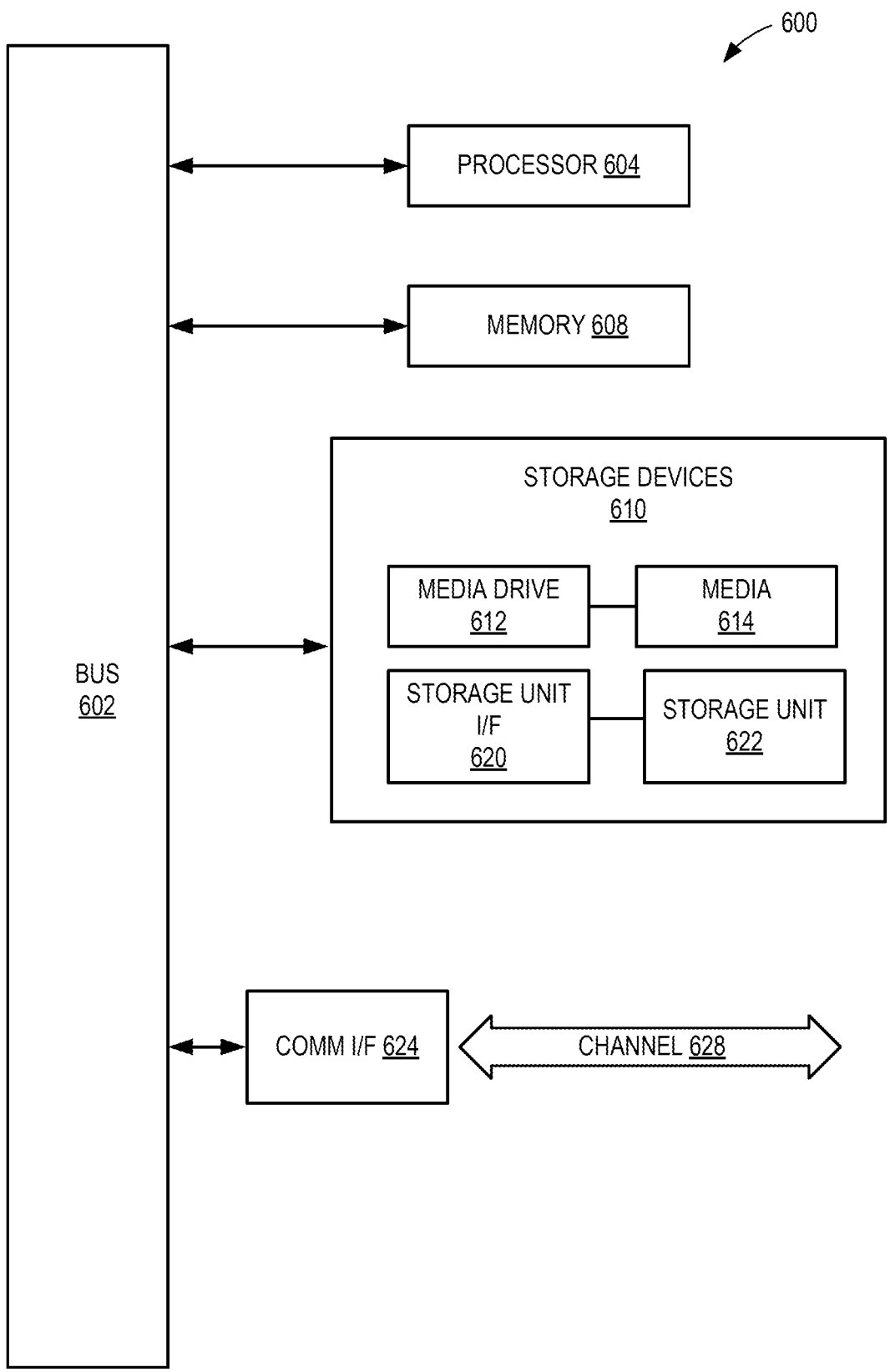
FIG. 6 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. This can include a processor, and/or any one or more of the components making up nozzle control system 300 of FIG. 3 and/or ECU 150 of FIG. 1. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or soft modem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 622, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A windshield wiper system comprising:
a wiper blade;
a windshield wiper arm configured to couple to the wiper blade and couple to a vehicle;
a plurality of nozzles disposed on the windshield wiper arm, wherein the plurality of nozzles comprises a spray nozzle configured to output a cleaning liquid and a gas nozzle configured to output a gas; and
a processor communicatively coupled to the plurality of nozzles, the processor configured to control the gas nozzle to selectively change a gas parameter that controls a gas output from the gas nozzle based on a direction of movement of the wiper blade and a position of the wiper blade on a windshield, wherein selectively changing the gas parameter comprises:
outputting a first amount of the gas during a first phase of wiper movement, the first phase comprising an initial upward stroke, and outputting a second amount of the gas during a second phase of the wiper movement, the second phase comprising an opposite trajectory relative to the first phase, wherein the first amount is larger than the second amount.

2. The windshield wiper system of claim 1, further comprising:
one or more actuators coupled to the plurality of nozzles and operable to change an orientation of the plurality of nozzles.

3. The windshield wiper system of claim 1, wherein the gas nozzle comprises one or more of: a first gas nozzle provided on a first side of the windshield wiper arm, a second gas nozzle provided on a second side of the windshield wiper arm opposite the first side, and a third gas nozzle provided on a surface of the windshield wiper arm that extends from the first side to the second side.

4. The windshield wiper system of claim 1, wherein the processor is further configured to control the plurality of nozzles to change the gas parameter based on the position of the wiper blade, wherein the position of the wiper blade is between a first position on the windshield and a second position on the windshield.

5. The windshield wiper system of claim 4, wherein the gas parameter is one or more of: a flow rate of the gas output from the gas nozzle, a pressure of the gas output from the gas nozzle, a direction of the gas output from the gas nozzle, and a volume of the gas output from the gas nozzle.

6. The windshield wiper system of claim 4, wherein the second position is at an opposite end of the range of motion relative to the first position.

7. The windshield wiper system of claim 4, wherein the second position is at an opposite end of the range of motion relative to the first position, wherein the gas nozzle is controlled to output the gas in a direction toward the second position when the wiper blade is in the first position.

8. The windshield wiper system of claim 7, wherein the gas nozzle is controlled to refrain from outputting the gas when the wiper blade is in the second position.

9. The windshield wiper system of claim 1, wherein the processor is further configured to selectively control the gas nozzle to output the gas based on a detected liquid on the windshield.

10. A method of operating a windshield wiper system, the method comprising:
tracking operating conditions on a windshield of a vehicle;
outputting gas from a first gas nozzle of a plurality of nozzles disposed on a windshield wiper assembly, the plurality of nozzles further comprising a spray nozzle; and
adjusting a gas parameter indicative of a gas output from the first gas nozzle based on the tracked operating conditions, wherein the tracked operating conditions comprise:
a position of a wiper blade of the windshield wiper assembly; and
a direction of movement of the wiper blade; and
outputting a higher amount of the gas when the wiper blade is at a first position and outputting a lower amount of the gas when the wiper blade is at a second position corresponding to a farthest permitted range of motion of the wiper blade and being at an opposite end of a permitted range of motion compared to the first position.

11. The method of claim 10, wherein the gas parameter comprises: a flow rate of the gas output from the first gas nozzle, a pressure of the gas output from the first gas nozzle, a direction of the gas output from the first gas nozzle, or a volume of the gas output from the first gas nozzle.

12. The method of claim 10, further comprising:
responsive to determining that the wiper blade is at the first position, outputting the gas from the first gas nozzle onto the windshield in a direction toward an upper edge of the windshield.

13. The method of claim 12, further comprising:
responsive to determining that the wiper blade is at the second position, refraining from outputting the gas.

14. The method of claim 10, further comprising:
responsive to detecting liquid on the windshield, outputting the gas onto the windshield.

15. The method of claim 10, wherein the gas parameter comprises a first gas parameter or a second gas parameter, the method further comprising:
comparing an amount of liquid detected on the windshield to a threshold amount;
responsive to the amount of liquid detected on the windshield being below the threshold amount, outputting the gas according to the first gas parameter; and
responsive to the amount of liquid detected on the windshield being equal to or above the threshold amount, outputting the gas according to the second gas parameter, the second gas parameter corresponding to a higher amount of gas than the first gas parameter.

16. The method of claim 10, wherein the windshield wiper system comprises a second windshield wiper assembly having a second gas nozzle, the gas comprises first gas, the method further comprising:
outputting second gas from the second gas nozzle independent of the first gas nozzle.

17. The method of claim 10, wherein the gas parameter comprises a first gas parameter or a second gas parameter, the gas comprises first gas, and the windshield wiper assembly comprises a first windshield wiper assembly, the method further comprising:
detecting liquid at a first area of the windshield, wherein the first area corresponds to the first windshield wiper assembly and a second area corresponds to a second windshield wiper assembly; and
responsive to detecting the liquid at the first area of the windshield, outputting the first gas from the first gas nozzle according to the first gas parameter and outputting second gas from a second gas nozzle of the second windshield wiper assembly according to the second gas parameter that differs from the first gas parameter.

18. A windshield wiper system comprising:
a windshield wiper arm configured to couple to a wiper blade and couple to a vehicle;
a plurality of nozzles disposed on the windshield wiper arm, wherein the plurality of nozzles comprises a spray nozzle configured to output a cleaning liquid and a gas nozzle configured to output a gas; and
one or more processors communicatively coupled to the plurality of nozzles and configured to selectively change a gas parameter to control the gas output from the gas nozzle based on a direction of movement of the wiper blade and a position of the wiper blade on a windshield, wherein controlling the gas output from the gas nozzle comprises:
outputting a higher amount of the gas when the wiper blade is at a first position; and
outputting a lower amount of the gas when the wiper blade is at a second position corresponding to a farthest permitted range of motion of the wiper blade and being at an opposite end of a permitted range of motion compared to the first position.

19. The windshield wiper system of claim 18, wherein controlling the gas output from the gas nozzle further comprises:
responsive to determining that the wiper blade is at the first position, outputting the gas from the first gas nozzle onto the windshield in a direction toward an upper edge of the windshield.

20. The windshield wiper system of claim 18, wherein controlling the gas output from the gas nozzle further comprises:
responsive to determining that the wiper blade is at the second position, refraining from outputting the gas.

* * * * *